United States Patent [19]

Barchechat

[11] Patent Number: 4,805,261

[45] Date of Patent: Feb. 21, 1989

[54] RESETTABLE FIRE LINK

[75] Inventor: Shlomo Barchechat, Wilmette, Ill.

[73] Assignee: Safe-Air of Illinois, Inc., Cicero, Ill.

[21] Appl. No.: 106,728

[22] Filed: Oct. 8, 1987

[51] Int. Cl.[4] .............................................. E05F 15/20
[52] U.S. Cl. ...................................... 16/48.5; 16/319;
  16/307; 16/222; 49/2; 160/6
[58] Field of Search ................ 16/48.5, 222, 319, 307;
  49/1, 2, 5; 267/156; 188/277; 160/6; 169/57, 59

[56] References Cited

U.S. PATENT DOCUMENTS

| | | | |
|---|---|---|---|
| 1,977,458 | 10/1934 | Stargardter | 267/156 |
| 2,821,379 | 1/1958 | Donkin | 267/156 |
| 2,952,337 | 9/1960 | Coffin | 188/277 |
| 3,725,972 | 4/1973 | McCabe | 49/2 |
| 3,889,314 | 6/1975 | McCabe | 16/48.5 |

Primary Examiner—Nicholas P. Godici
Assistant Examiner—Edward A. Brown
Attorney, Agent, or Firm—Wallenstein Wagner Hattis & Strampel, Ltd.

[57] ABSTRACT

A resettable fire link includes a first member (12) that pivotally supports a latch arm (20) thereon with a bi-metallic coil spring (30) interposed between the first member and the free end of the latch arm to normally bias the latch arm into a latched position with a release plate (50). The bi-metallic coil spring pivots the latch arm to a release position upon being elevated in temperature.

3 Claims, 1 Drawing Sheet

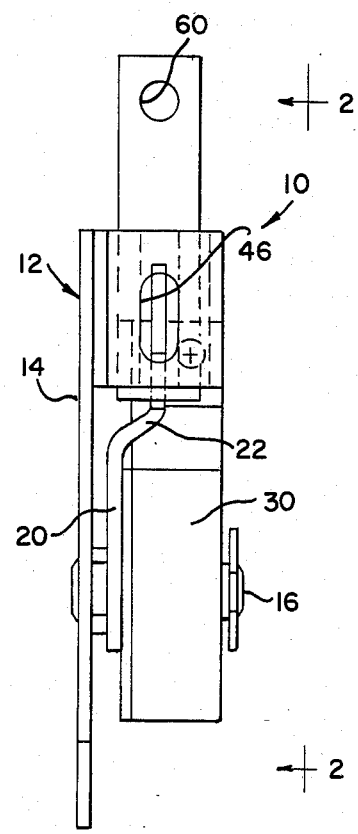
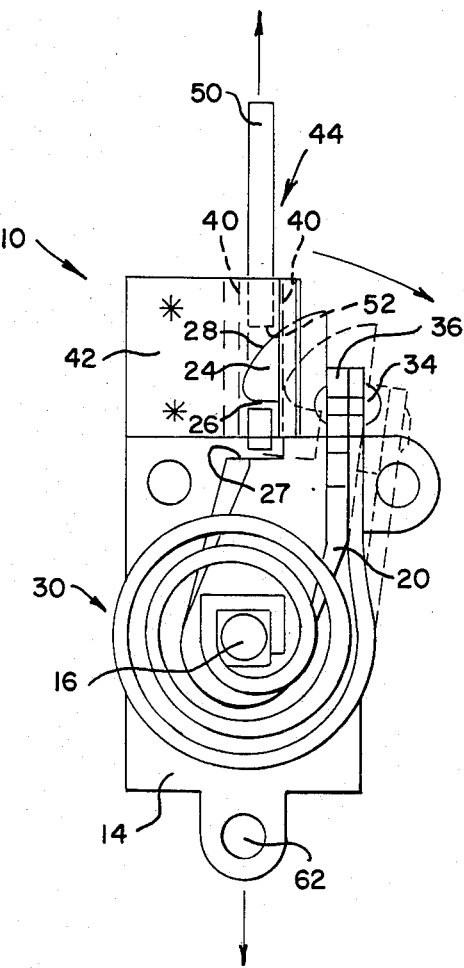

RESETTABLE FIRE LINK

DESCRIPTION

1. Technical Field

The present invention relates to links for use in automatically-actuated equipment and, more particularly, to a fire or smoke link for use with devices such as fire dampers in air ducts and/or fire-rated walls.

2. Background Prior Art

Many larger commercial buildings now utilize dampers in the air ducts to control the flow of smoke and heated air during a fire. Usually the damper consists of a frame structure that has a plurality of louvers or blades pivoted thereon between open and closed positions. In many instances, the blades of the damper are biased towards a closed position and are held in an open position by a fusible link. These dampers are also used in fire-rated walls. The fusible link in the past has been made of two pieces of metal that are fused together with solder, which melts at a predetermined temperature to release the damper-louvers and allow them to close by the spring pressure.

In the past decade, resettable links have been developed which can be used with fire dampers and can be reset after being heat activated.

In many instances, it may also be desirable to provide a remote control for activating the link in conditions where only smoke is flowing through the ducts without any excessive heat. Thus, U.S. Pat. No. 3,725,972 discloses a bi-metallic link for effecting the opening and closing of a damper and the link includes heating means for allowing the bi-metallic element to be heated remotely to release the damper blades.

Another example of a heat-actuated link is disclosed in U.S. Pat. No. 3,889,314.

SUMMARY OF THE INVENTION

According to the present invention, a resettable fire link is designed such that it can be mounted in a small open area, is easy to manufacture at a minimum cost, and is more reliable to release at a predetermined temperature.

According to the present invention, the releasable fire link includes a support having a latch arm pivoted thereon with the arm engaging a release plate. A bi-metallic member is interposed between the support and the latch arm to pivot the latch arm to a release position in response to an increase in temperature of the bi-metallic member.

More specifically, the resettable link consists of a support plate that has a post extending therefrom with the plate having a slot that receives the release plate. The bi-metallic member consists of a spirally-formed bi-metallic coil spring that has one end secured to the post and encircling the post with the opposite end connected to the latch arm. The latch arm preferably has a camming surface leading to a flat latching surface. Thus, the link can easily be reset without any tools.

BRIEF DESCRIPTION OF DRAWINGS

FIG. 1 is an end view of the fire link of the present invention; and,

FIG. 2 is a side elevational view as viewed along line 2—2 of FIG. 1.

DETAILED DESCRIPTION

While this invnetion is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIGS. 1 and 2 show the resettable fire link, generally designated by reference numeral 10, and constructed in accordance with the teachings of the present invention. The resettable fire link 10 includes a support 12 consisting of a flat plate 14 that has a post 16 extending therefrom. The post 16 is preferably square in cross-section and has rounded portions adjacent opposite ends. A latch arm 20 is pivoted at one end on the rounded portion of the post 16 and has an opposite end 22 offset away from plate 14, for a purpose that will described later. The upper free end of the latch arm 20 has a latch member 24 formed integral therewith. The latch member 24 has a flat lower latching surface 26 which is produced by a slot 27 in the arm 20 and which merges with a camming surface 28, the purpoe of which will be described later.

A spirally-formed bi-metallic member 30 has one end connected to the rectangular portion of the post 16 and an opposite end connected by a connection, such as rivet 34, to a plate 36 that forms part of the latch arm.

The support 12 also includes a pair of plates 40 that are connected at the inner end to the plate 14 with a cover plate 42 closing the outer ends thereof to define an elongated slot 44. The outer plate 40 has an opening 46 for receiving the latch member 24 therethrough and into abutting engagement with the second plate 40. The release plate 50 also has a slot 52 adjacent the lower end thereof, which receives the latch member 24.

Thus, in the assembled condition shown in FIG. 2, the latch member 24 is received through the slots 46 and 52 and is held in the solid line position by the coiled bi-metallic element 30, which biases the latch member 24 against the plate 40. In this assembled condition, the resettable link can be interposed between a tension member, such as a cable, that holds the blades of a damper in an open position. For this purpose, the release plate or link 50 has an opening 60 therein, while the base plate 14 likewise has an opening 62.

During operation, excessive heat in the area surrounding the resettable fire link will cause the bi-metallic element 30 to uncoil, thereby pivoting the latch arm about the post 16 and ultimately withdrawing the latching surface 26 from the slot 52 to allow the tension on the release plate 50 to separate the release plate from the latch arm. Thereafter, when the bi-metallic coil spring has its temperature reduced to an ambient temperature, the coil spring will automatically move the latch arm to the latching position, shown in solid line in FIG. 2.

The resettable fire link can easily be reset by forcing the release plate 50 into the slot 44 and the camming surface 28 will move the latching surface 26 out of the slot against the force of coil spring 30 to receive the release plate. When the slot 52 in the release plate becomes aligned with the latching arm, the bi-metallic coil spring 30 will move the latching arm into the slot and the link is ready for continued operation.

While the specific embodiments have been illustrated and described, numerous modifications come to mind without significantly departing from the spirit of the invention and the scope of protection is only limited by the scope of the accompanying claims.

I claim:

1. A resettable fire link comprising a first member having a support post thereon, a separate latch arm pivoted on said post, a latching element on a free end of said latch arm, a release plate having a slot for receiving said latch element, and a separate bi-metallic coil spring surrounding said post and spaced axially from said latch arm at said post, said spring having one end connected to said post and an opposite end connected to said free end of said latch arm and normally biasing said latch element into said slot while pivoting said latch arm to a released position upon being elevated to a predetermined temperature.

2. A resettable fire link as defined in claim 1, in which said first member includes plate means defining a slot for said release plate.

3. A resettable fire link as defined in claim 1, in which said latch arm has a latching surface with a camming surface leading from said latching surface engageable by said release plate during resetting of said link.

* * * * *